(12) United States Patent
Chen et al.

(10) Patent No.: US 12,712,174 B2
(45) Date of Patent: Aug. 18, 2026

(54) LONG-LIFE SECONDARY BATTERY, BATTERY MODULE, BATTERY PACK, AND POWER CONSUMPTION APPARATUS

(71) Applicant: CONTEMPORARY AMPEREX TECHNOLOGY (HONG KONG) LIMITED, Hong Kong (CN)

(72) Inventors: Xiao Chen, Ningde City (CN); Guangjun Wang, Ningde City (CN); Yonghuang Ye, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 565 days.

(21) Appl. No.: 18/346,794

(22) Filed: Jul. 4, 2023

(65) Prior Publication Data

US 2023/0369556 A1 Nov. 16, 2023

Related U.S. Application Data

(63) Continuation of application No. PCT/CN2022/074932, filed on Jan. 29, 2022.

(51) Int. Cl.
*H01M 4/04* (2006.01)
*H01M 4/02* (2006.01)
*H01M 4/66* (2006.01)

(52) U.S. Cl.
CPC ......... *H01M 4/0404* (2013.01); *H01M 4/661* (2013.01); *H01M 2004/021* (2013.01)

(58) Field of Classification Search
CPC .... H01M 4/0404; H01M 4/661; H01M 4/667; H01M 2004/021
See application file for complete search history.

(56) References Cited

U.S. PATENT DOCUMENTS

2008/0176140 A1 7/2008 Nishiyama et al.
2009/0246631 A1* 10/2009 Hojo .................... H01M 4/134 429/231.1

(Continued)

FOREIGN PATENT DOCUMENTS

CN 101079500 A 11/2007
CN 101685851 A 3/2010

(Continued)

OTHER PUBLICATIONS

English translation of JP Publication 2011-192562, Sep. 2011.*

(Continued)

*Primary Examiner* — Brittany L Raymond
(74) *Attorney, Agent, or Firm* — K&L Gates LLP

(57) ABSTRACT

Provided are a secondary battery which includes a positive electrode sheet, a negative electrode sheet, and a separator placed between the positive electrode sheet and the negative electrode sheet. In some embodiments, the positive electrode sheet includes a positive electrode current collector and positive film layers A1 and B1 respectively provided on two surfaces of the positive electrode current collector, and the negative electrode sheet includes a negative electrode current collector and negative film layers respectively provided on two surfaces of the negative electrode current collector, where capacities per unit area Cap A1 and Cap B1 of the positive film layers A1 and B1 satisfy Cap A1<Cap B1, and the negative electrode current collector of the negative electrode sheet is provided with at least one through hole.

14 Claims, 3 Drawing Sheets

(56) References Cited

U.S. PATENT DOCUMENTS

| | | | |
|---|---|---|---|
| 2010/0075224 | A1 | 3/2010 | Naoi et al. |
| 2015/0340732 | A1 | 11/2015 | Kim et al. |
| 2016/0133930 | A1 | 5/2016 | Kim et al. |
| 2020/0313171 | A1 | 10/2020 | Wang et al. |

FOREIGN PATENT DOCUMENTS

| | | | | |
|---|---|---|---|---|
| CN | 103779581 | A | | 5/2014 |
| CN | 103872374 | A | | 6/2014 |
| CN | 105247706 | A | | 1/2016 |
| CN | 105449139 | | * | 3/2016 |
| CN | 110010902 | A | | 7/2019 |
| CN | 213692108 | U | | 7/2021 |
| JP | 2011-192562 | | * | 9/2011 |
| KR | 20180006054 | A | | 1/2018 |

OTHER PUBLICATIONS

English translation of CN Publication 105449139, Mar. 2016.*
The extended European search report received in the counterpart EP application 22917626.8, dated Apr. 11, 2025, 6 pages.
International Search Report received in the corresponding International Application PCT/CN2022/074932, mailed Oct. 25, 2022.
Written Opinion received in the corresponding International Application PCT/CN2022/074932, mailed Oct. 25, 2022.

* cited by examiner

LONG-LIFE SECONDARY BATTERY, BATTERY MODULE, BATTERY PACK, AND POWER CONSUMPTION APPARATUS

CROSS-REFERENCE TO RELATED APPLICATIONS

This application is a continuation of International Application PCT/CN2022/074932, filed Jan. 29, 2022 and entitled "LONG-LIFE SECONDARY BATTERY, BATTERY MODULE, BATTERY PACK, AND POWER CONSUMPTION APPARATUS", which is incorporated herein by reference in its entirety.

TECHNICAL FIELD

The present application relates to the field of secondary battery technologies, and in particular, to a long-life secondary battery, a battery module, a battery pack, and a power consumption apparatus.

BACKGROUND

In recent years, with the wider application of secondary batteries, the secondary batteries are widely applied to energy storage power systems, such as hydraulic power, thermal power, wind power and solar power plants, as well as many fields, such as electric tools, electric bicycles, electric motorcycles, electric vehicles, military equipment and aerospace. Due to the great development of the secondary batteries, higher requirements are put forward for their energy density, cycle performance, safety performance and the like.

The improvement of cycle performance of secondary batteries can not only reduce costs, but also reduce environmental protection pressure caused by recycling the secondary batteries, which is of great significance.

SUMMARY

The present application is made in view of the foregoing problem, the objective is to provide a secondary battery, and the secondary battery has improved cycle performance and safety performance.

In order to achieve the foregoing objective, the present application provides a secondary battery, a battery module, a battery pack, and a power consumption apparatus.

In a first aspect of the present application, a secondary battery is provided, including a positive electrode sheet, a negative electrode sheet, and a separator placed between the positive electrode sheet and the negative electrode sheet, the positive electrode sheet including a positive electrode current collector and positive film layers A1 and B1 respectively provided on two surfaces of the positive electrode current collector, and the negative electrode sheet including a negative electrode current collector and negative film layers respectively provided on two surfaces of the negative electrode current collector, where capacities per unit area Cap A1 and Cap B1 of the positive film layers A1 and B1 satisfy Cap A1<Cap B1, and the negative electrode current collector of the negative electrode sheet is provided with at least one through hole.

Therefore, according to the present application, by adjusting and controlling a capacity ratio of positive film layers on both sides of a positive electrode current collector and further adopting a manner of drilling a hole on a negative electrode current collector, the effects of slowing down the attenuation of a secondary battery and prolonging the service life are achieved, that is, cycle performance of the secondary battery is improved.

In any embodiment, the capacities per unit area Cap A1 and Cap B1 of the positive film layers A1 and B1 satisfy 0.7≤Cap A1/Cap B1<1. When a ratio of the capacity per unit area Cap A1 of the positive film layer A1 to the capacity per unit area Cap B2 of the positive film layer B1 is within a given range, the cycle performance of the secondary battery can be further improved.

In any embodiment, a negative film layer provided opposite to and separated from the positive film layer A1 by a separator is A2, and capacities per unit area Cap A2 and Cap A1 of the negative film layer A2 and the positive film layer A1 satisfy 1.02≤Cap A2/Cap A1≤1.2. When a ratio of the capacity per unit area Cap A2 of the negative film layer A2 to the capacity per unit area Cap A1 of the positive film layer A1 is within a given range, safety performance of the secondary battery can be improved.

In any embodiment, a negative film layer provided opposite to and separated from the positive film layer B1 by a separator is B2, and capacities per unit area Cap B2 and Cap B1 of the negative film layer B2 and the positive film layer B1 satisfy max(Cap A1/Cap B1, (Cap B1+Cap A1−Cap A2)/Cap B1)≤Cap B2/Cap B1≤1. When a ratio of the capacity per unit area Cap B2 of the negative film layer B2 to the capacity per unit area Cap B1 of the positive film layer B1 is within a given range, an amount of a negative active material used can be reduced in a case of ensuring that no lithium plating occurs on the negative film layer B2, thereby improving energy density of the secondary battery.

In any embodiment, a ratio of an area of the through hole to an area of the negative electrode current collector is 0.2%-40%. When the ratio of the area of the through hole to the area of the negative electrode current collector is within a given range, production processability of the negative electrode sheet and the conduction effect of lithium ions of AB faces of the negative film layers can be taken into account.

In any embodiment, a pore diameter of the through hole is 5-500 μm, or optionally 50-250 μm. When the pore diameter of the through hole is within a given range, strength of the negative electrode sheet and uniformity of current density of the negative electrode sheet can be taken into account.

In any embodiment, compacted density of the positive electrode sheet is 2.0-3.6 g/cc, or optionally 2.3-3.5 g/cc.

In some embodiments, compacted density of the negative electrode sheet is 0.5-2 g/cc, or optionally 1.0-1.8 g/cc.

In a second aspect of the present application, a battery module is provided, and the battery module includes the secondary battery in the first aspect of the present application.

In a third aspect of the present application, a battery pack is provided, and the battery pack includes the battery module in the second aspect of the present application.

In a fourth aspect of the present application, a power consumption apparatus is provided, and the power consumption apparatus includes at least one selected from the secondary battery in the first aspect of the present application, the battery module in the second aspect of the present application, or the battery pack in the third aspect of the present application.

The battery module, the battery pack, and the power consumption apparatus of the present application include the secondary battery of the present application, and thus have at least the same advantages as the secondary battery.

DESCRIPTION OF REFERENCE SIGNS

Figure 1:
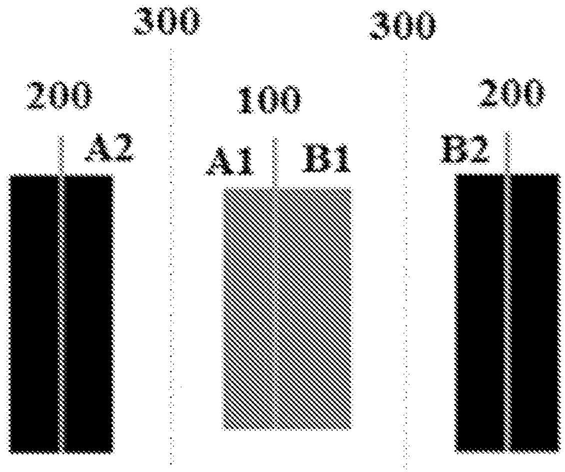
FIG. 1 is a schematic diagram of a jelly roll of a secondary battery according to an embodiment of the present application.

1 battery pack; 2 upper box body; 3 lower box body; 4 battery module; 5 secondary battery; 51 housing; 52 electrode assembly; 53 top cover assembly; 100 positive electrode sheet; 200 negative electrode sheet; 300 separator; 201 negative electrode current collector; 202 through hole.

DESCRIPTION OF EMBODIMENTS

Embodiments that specifically disclose a secondary battery, a battery module, a battery pack and a power consumption apparatus of the present application will be described below in detail with reference to the accompanying drawings as appropriate. However, unnecessarily detailed descriptions may be omitted in some cases. For example, detailed description for a well-known matter and repeated description for a practically identical structures are omitted. This is done to avoid unnecessarily redundant descriptions for ease of understanding by persons skilled in the art. In addition, the drawings and the following description are provided for persons skilled in the art to fully appreciate the present application, and are not intended to limit the subject matters described in the claims.

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of a combination of these numerical values. In addition, when a certain parameter is expressed as an integer ≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, all steps of the present application may be performed sequentially or randomly, but preferably, performed sequentially. For example, a method includes steps (a) and (b), which means that the method may include steps (a) and (b) performed sequentially, or steps (b) and (a) performed sequentially. For example, the method mentioned may further include step (c), which means that step (c) may be added to the method in any order, for example, the method may include steps (a), (b) and (c), steps (a), (c) and (b), steps (c), (a) and (b), or the like.

Unless otherwise specified, "comprising" and "containing" mentioned in the present application are open-ended or closed-ended. For example, the "comprising" and "containing" may mean that other components that are not listed may further be comprised or contained, or only listed components may be comprised or contained.

Unless otherwise specified, in the present application, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

With the popularization and expansion of application scenarios of secondary batteries, the demand for the service life of the secondary batteries is increasing with years. The improvement of cycle performance of the secondary batteries can not only achieve the purpose of reducing costs, but also reduce environmental protection pressure caused by recycling the secondary batteries, which is of great significance.

At present, in order to increase the service life of a secondary battery, the following measures are generally taken: (1) improving surface coating of an active material and reducing surface side reactions; (2) improving a content of a conductive substance and reducing resistance; (3) reducing a battery usage interval, or the like. However, these measures all bring high cost increases and technical challenges.

After a lot of experiments, the inventor of the present application found that, by adjusting a capacity ratio of positive film layers on both sides of a positive electrode sheet and combining a manner of drilling a hole on a negative electrode current collector, active lithium consumption during charging and discharging could be supplemented, thereby achieving the effects of slowing down the attenuation of a secondary battery and prolonging its service life.

In an embodiment of the present application, the present application provides a secondary battery which includes a positive electrode sheet, a negative electrode sheet, and a separator placed between the positive electrode sheet and the negative electrode sheet, the positive electrode sheet includes a positive electrode current collector and positive film layers A1 and B1 respectively provided on two surfaces of the positive electrode current collector, and the negative electrode sheet includes a negative electrode current collector and negative film layers respectively provided on two surfaces of the negative electrode current collector, where capacities per unit area Cap A1 and Cap B1 of the positive film layers A1 and B1 satisfy Cap A1<Cap B1, and the negative electrode current collector of the negative electrode sheet is provided with at least one through hole.

Although the mechanism has not been clear yet, the inventor of the present application speculated about the following reasons: according to the present application, by adjusting and controlling a capacity ratio of positive film layers on both sides of a positive electrode sheet, the effect of pre-storing active lithium in a secondary battery in the positive electrode sheet is achieved; and by further adopting a manner of drilling a hole on a negative electrode current collector, the active lithium pre-stored in the positive electrode sheet can be slowly transferred to a negative electrode sheet during use, and finally released to supplement the active lithium consumption of the system, and the effects of slowing down the attenuation of the secondary battery and prolonging the service life are achieved, that is, cycle performance of the secondary battery is improved.

In some embodiments, the capacities per unit area Cap A1 and Cap B1 of the positive film layers A1 and B1 satisfy 0.7≤Cap A1/Cap B1<1, optionally, 0.7≤Cap A1/Cap B1≤0.99, 0.8≤Cap A1/Cap B1≤0.99, 0.7≤Cap A1/Cap B1≤0.95, or further optionally 0.7≤Cap A1/Cap B1≤0.8. When a ratio of the capacity per unit area Cap A1 of the positive film layer A1 to the capacity per unit area Cap B2 of the positive film layer B1 is within a given range, the capacity pre-stored in the positive film layer B1 of the positive electrode sheet in an initial state can be adjusted and controlled, thereby further improving the cycle performance of the secondary battery.

In some embodiments, a negative film layer provided opposite to and separated from the positive film layer A1 by a separator is A2, and capacities per unit area Cap A2 and Cap A1 of the negative film layer A2 and the positive film layer A1 satisfy 1.02≤Cap A2/Cap A1≤1.2, or optionally 1.02≤Cap A2/Cap A1≤1.1. When a ratio of the capacity per unit area Cap A2 of the negative film layer A2 to the capacity per unit area Cap A1 of the positive film layer A1 is within a given range, it can be ensured that no lithium plating occurs on the negative film layer A2, thereby improving safety performance of the secondary battery.

In some embodiments, a negative film layer provided opposite to and separated from the positive film layer B1 by a separator is B2, and capacities per unit area Cap B2 and Cap B1 of the negative film layer B2 and the positive film layer B1 satisfy max(Cap A1/Cap B1, (Cap B1+Cap A1−Cap A2)/Cap B1)≤Cap B2/Cap B1≤1.

It should be noted that, max(Cap A1/Cap B1, (Cap B1+Cap A1−Cap A2)/Cap B1) means taking the greater one of numerical values resulted from Cap A1/Cap B1 and (Cap B1+Cap A1−Cap A2).

When a ratio of the capacity per unit area Cap B2 of the negative film layer B2 to the capacity per unit area Cap B1 of the positive film layer B1 is within a given range, an amount of a negative active material used can be reduced in a case of ensuring that no lithium plating occurs on the negative film layer B2, thereby improving energy density of the secondary battery.

As shown in FIG. 1, the secondary battery includes a positive electrode sheet 100, a negative electrode sheet 200, and a separator 300 placed between the positive electrode sheet and the negative electrode sheet, the positive electrode sheet 100 includes a positive electrode current collector and positive film layers A1 and B1 respectively provided on two surfaces of the positive electrode current collector, the negative electrode sheet 200 includes a negative electrode current collector and negative film layers respectively provided on two surfaces of the negative electrode current collector, a negative film layer provided opposite to and separated from the positive film layer A1 by a separator is A2, and a negative film layer provided opposite to and separated from the positive film layer B1 by a separator is B2.

Figure 2:
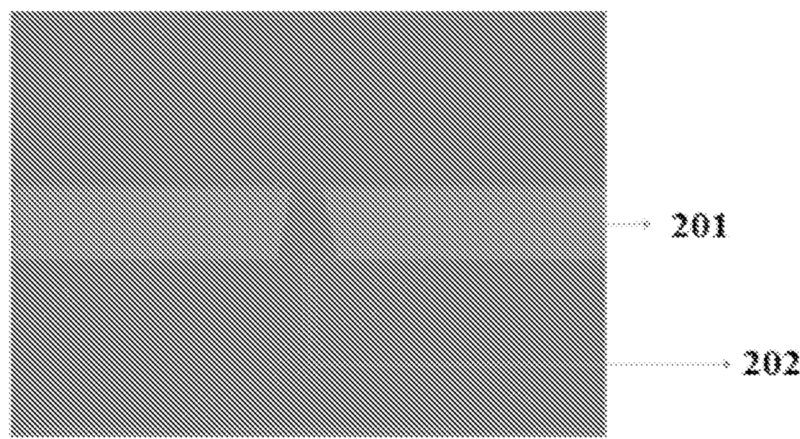
FIG. 2 is a schematic diagram of a negative electrode sheet of a secondary battery according to an embodiment of the present application.

As shown in FIG. 2, a negative electrode current collector 201 of a negative electrode sheet is provided with at least one through hole 202, and negative film layers on two surfaces of the negative electrode current collector can be communicated through the through hole 202.

The capacities per unit area of the positive film layers and the negative film layers can be determined respectively by the following method: determining the mass per unit area of an active material in a positive film layer or a negative film layer; determining a gram capacity of the active material of the positive film layer or the negative film layer, for example using a button cell testing method or the like; and multiplying the mass by the gram capacity to obtain a capacity per unit area of the positive film layer or the negative film layer.

In the embodiments of the present application, the shape of the through hole is not particularly limited, and may be rectangular, square, circular, elliptical, polygonal, or the like.

In the embodiments of the present application, when the negative electrode current collector of the negative electrode sheet is provided with more than one through hole, the arrangement of the through holes is not particularly limited.

In some embodiments, a ratio of an area of the through hole to an area of the negative electrode current collector is 0.2%-40%, or optionally 0.5-20%. When the ratio of the area of the through hole to the area of the negative electrode current collector is within a given range, production processability of the negative electrode sheet and the conduction effect of lithium ions of AB faces of the negative film layers can be taken into account.

In some embodiments, a pore diameter of the through hole is 5-500 μm, or optionally 50-250 μm. When the pore diameter of the through hole is within a given range, strength of the negative electrode sheet and uniformity of current density of the negative electrode sheet can be taken into account. When the shape of the through hole is non-circular, the pore diameter of the through hole is regarded as a circular hole can be equivalently calculated according to hole area×substrate thickness.

In some embodiments, compacted density of the positive electrode sheet is 2.0-3.6 g/cc, or optionally 2.3-3.5 g/cc.

In some embodiments, compacted density of the negative electrode sheet is 0.5-2 g/cc, or optionally 1.0-1.8 g/cc.

In some embodiments, two negative electrode sheets, one positive electrode sheet, and two separators are assembled into a single-layered laminated battery cell. A separator and a first copper wire are inserted between the positive film layer A1 and the negative film layer A2, and a separator and a second copper wire are inserted between the positive electrode film layer B1 and the negative electrode film layer B2. Chemical conversion is performed after the single-layer laminated jelly roll is injected with an electrolytic solution to plate lithium on the copper wires. Then, a voltage v1 between the first copper wire and the negative film layer A2 and a voltage v2 between the second copper wire and the negative film layer B2 are detected at 25° C. during the first charging period, and the smaller one of v1 and v2 satisfies min(v1, v2)>−20 mV. Through this method, firstly, it can be determined that there is no risk of lithium plating, and secondly, whether it conforms to the product characteristics is checked.

In addition, the secondary battery, the battery module, the battery pack, and the power consumption apparatus of the present application will be described below with reference to the accompanying drawings as appropriate.

In an embodiment of the present application, a secondary battery is provided.

Typically, the secondary battery includes a positive electrode sheet, a negative electrode sheet, an electrolyte, and a separator. During charging and discharging of the battery, active ions are intercalated and deintercalated back and forth between the positive electrode sheet and the positive electrode sheet. The electrolyte plays the role of conducting ions between the positive electrode sheet and the negative electrode sheet. The separator is provided between the positive electrode sheet and the negative electrode sheet, and mainly plays the role of preventing a short circuit between positive and negative electrodes while allowing the ions to pass.

[Positive Electrode Sheet]

A positive electrode sheet includes a positive electrode current collector and a positive film layer provided on at least one surface of the positive electrode current collector, and the positive film layer includes a positive active material.

As an example, the positive electrode current collector has two surfaces opposite in its own thickness direction, and the positive film layer is provided on either or both of the two opposite surfaces of the positive electrode current collector.

In some embodiments, the positive electrode current collector may be metal foil or a composite current collector. For example, as the metal foil, aluminum foil may be used. The composite current collector may include a polymer material base layer and a metal layer formed on at least one surface of the polymer material base layer. The composite current collector may be formed by synthesizing a metal material (aluminum, aluminum alloy, nickel, nickel alloy, titanium, titanium alloy, silver and silver alloy, or the like) on a polymer material substrate (such as a substrate of polypropylene (PP), polyethylene glycol terephthalate (PET), polybutylene terephthalate (PBT), polystyrene (PS), polyethylene (PE), or the like).

In some embodiments, the positive active material may be a positive active material for a battery well-known in the art. As an example, the positive active material may include at least one of the following materials: a lithium-containing phosphate of an olivine structure, a lithium transition metal oxide, and their respective modified compounds. However, the present application is not limited to these materials, and other conventional materials that may be used as the positive active material of the battery may also be used. These positive active materials may be used alone, or two or more types may be used in combination. Examples of the lithium transition metal oxide may include, but are not limited to, at least one of a lithium cobalt oxide (such as $LiCoO_2$), a lithium nickel oxide (such as $LiNiO_2$), a lithium manganese oxide (such as $LiMnO_2$, $LiMn_2O_4$), a lithium nickel cobalt oxide, a lithium manganese cobalt oxide, a lithium nickel manganese oxide, a lithium nickel cobalt manganese oxide (such as $LiNi_{1/3}Co_{1/3}Mn_{1/3}O_2$ (or referred to as $NCM_{333}$ for short), $LiNi_{0.5}Co_{0.2}Mn_{0.3}O_2$ (or referred to as $NCM_{523}$ for short), $LiNi_{0.5}Co_{0.25}Mn_{0.25}O_2$ (or referred to as $NCM_{211}$ for short), $LiNi_{0.6}Co_{0.2}Mn_{0.2}O_2$ (or referred to as $NCM_{622}$ for short), $LiNi_{0.8}Co_{0.1}Mn_{0.1}O_2$ (or referred to as $NCM_{811}$ for short), a lithium nickel cobalt aluminum oxide (such as $LiNi_{0.85}Co_{0.15}Al_{0.05}O_2$), their modified compounds, and the like. Examples of the lithium-containing phosphate of the olivine structure may include, but are not limited to, at least one of lithium iron phosphate (such as $LiFePO_4$ (or referred to as LFP for short)), a composite of lithium iron phosphate and carbon, lithium manganese phosphate (such as $LiMnPO_4$), a composite of lithium manganese phosphate and carbon, lithium manganese iron phosphate, and a composite of lithium manganese iron phosphate and carbon.

In some embodiments, the positive active material is a sodium ion positive material, such as transition metal oxides, polyanionic compounds, and Prussian Blue analogs.

In some embodiments, the positive active material is LFP or $NCM_{523}$.

In some embodiments, the positive film layer further optionally includes a binder. As an example, the binder may include at least one of a polyvinylidene fluoride (PVDF), a polytetrafluoroethylene (PTFE), polyacrylic acid (PAA), polyimide (PI), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and fluorine-containing acrylate resin.

In some embodiments, the binder is a polyvinylidene fluoride (PVDF), polyacrylic acid (PAA), a polytetrafluoroethylene (PTFE), or polyimide (PI).

In some embodiments, the positive film layer further optionally includes a conductive agent. As an example, the conductive agent may include at least one of graphite, superconducting carbon, acetylene black, carbon black, Ketjen black, carbon dots, carbon nanotubes, graphene, and carbon nanofibers.

In some embodiments, the conductive agent is at least one of graphite, carbon black, acetylene black, graphene, and carbon nanotubes.

In some embodiments, the positive electrode sheet may be prepared by the following means: dispersing the foregoing components for preparing a positive electrode sheet, such as the positive active material, the conductive agent, the binder and any other components, in a solvent (such as N-methylpyrrolidone (NMP)) to form a positive electrode slurry; and coating the positive electrode slurry on a positive electrode current collector, and obtaining the positive electrode sheet after processes of drying, cold pressing, and the like.

[Negative Electrode Sheet]

A negative electrode sheet includes a negative electrode current collector and a negative film layer provided on at least one surface of the negative electrode current collector, and the negative film layer includes a negative active material.

As an example, the negative electrode current collector has two surfaces opposite in its own thickness direction, and the negative film layer is provided on either or both of the two opposite surfaces of the negative electrode current collector.

In some embodiments, the negative electrode current collector may be metal foil or a composite current collector. For example, as the metal foil, copper foil may be used. The composite current collector may include a polymer material base layer and a metal layer formed on at least one surface of the polymer material substrate. The composite current collector may be formed by synthesizing a metal material (copper, copper alloy, nickel, nickel alloy, titanium, titanium alloy, silver, silver alloy, or the like) on the polymer material substrate (such as a substrate of polypropylene (PP), polyethylene glycol terephthalate (PET), polybutylene terephthalate (PBT), polystyrene (PS), polyethylene (PE), or the like).

In some embodiments, the negative active material may be a negative active material for a battery well-known known in the art. As an example, the negative active material may include at least one of the following materials: artificial graphite, natural graphite, graphene, carbon nanotubes, soft carbon, hard carbon, silicon-based material, tin-based material, lithium titanate, and the like. The silicon-based material may be selected from at least one of elemental silicon, a silicon-oxygen compound, a silicon-carbon composite, a silicon-nitrogen composite and a silicon alloy. The tin-based material can be selected from at least one of elemental tin, a tin-oxygen compound and a tin alloy. However, the present application is not limited to these materials, and other conventional materials that may be used as the negative active material of the battery may also be used. These negative active materials may be used alone, or two or more types may be used in combination.

In some embodiments, the negative active material is at least one of natural graphite, artificial graphite, graphene, carbon nanotubes, soft carbon, and hard carbon.

In some embodiments, the negative active material is at least one of natural graphite and artificial graphite.

In some embodiments, the negative film layer further optionally includes a binder. The binder may be selected from at least one of styrene-butadiene rubber (SBR), polyacrylic acid (PAA), polyacrylate sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative film layer further optionally includes a conductive agent. The conductive agent may be selected from at least one of superconducting carbon, acetylene black, carbon black, Ketjen black, carbon dots, carbon nanotubes, graphene, and carbon nanofibers.

In some embodiments, the negative film layer further optionally includes another additive, such as a thickener (for example, sodium carboxymethyl cellulose (CMC-Na)).

In some embodiments, the negative electrode sheet may be prepared by the following means: dispersing the foregoing components for preparing a negative electrode sheet, such as the negative active material, the conductive agent, the binder and any other components, in a solvent (such as deionized water) to form a negative electrode slurry; and coating the negative electrode slurry on a negative electrode current collector, and obtaining the negative electrode sheet after processes of drying, cold pressing, and the like.

[Electrolyte]

An electrolyte plays the role of conducting ions between a positive electrode sheet and a negative electrode sheet. The type of the electrolyte is not specifically limited in the present application, and can be selected according to needs. For example, the electrolyte may be liquid, gel or all solid.

In some embodiments, the electrolyte is an electrolytic solution. The electrolytic solution includes an electrolyte salt and a solvent.

In some embodiments, the electrolyte salt may be selected from at least one of lithium hexafluorophosphate, lithium tetrafluoroborate, lithium perchlorate, lithium hexafluorarsenate, lithium bisfluorosulfonimide, lithium bistrifluoromethanesulfonimidate, lithium trifluoromethanesulfonate, lithium difluorophosphate, lithium difluorooxalateborate, lithium bisoxalateborate, lithium difluorobisoxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone and diethyl sulfone.

In some embodiments, the electrolytic solution further optionally includes an additive. For example, the additive may include a negative electrode film-forming additive, or a positive electrode film-forming additive, or may further include an additive that can improve specific performance of the battery, such as, an additive for improving overcharge performance of the battery, or an additive for improving high-temperature performance or low-temperature performance of the battery.

[Separator]

In some embodiments, the secondary battery further includes a separator. The type of the separator is not particularly limited in the present application, and any well-known porous-structure separator with good chemical stability and mechanical stability can be selected.

In some embodiments, the material of the separator may be selected from at least one of polyolefin (such as polyethylene, polypropylene), polyester, polyimide, polyamide, cellulose, glass fiber, nonwoven fabric and polyvinylidene fluoride. The separator may be a single-layered thin film or a multi-layered composite thin film, which is not particularly limited. When the separator is a multi-layered composite thin film, the material of each layer can be the same or different, which is not particularly limited.

In some embodiments, the separator is a polyolefin film, a polyester film, a polyimide film, a polyamide film, or a cellulose film.

In some embodiments, the separator is a polyethylene film or a polypropylene film.

In some embodiments, the positive electrode sheet, the negative electrode sheet and the separator may be subject to a winding process or a lamination process, to obtain an electrode assembly.

In some embodiments, the secondary battery may include an outer package.

The outer package may be used to package the foregoing electrode assembly and electrolyte.

In some embodiments, the outer package of the secondary battery may be a hard shell such as a hard plastic shell, an aluminum shell, or a steel shell. The outer package of the secondary battery may be a soft package, such as a soft bag. A material of the soft package may be plastic, for example, polypropylene, polybutylene terephthalate, polybutylene succinate.

Figure 3:
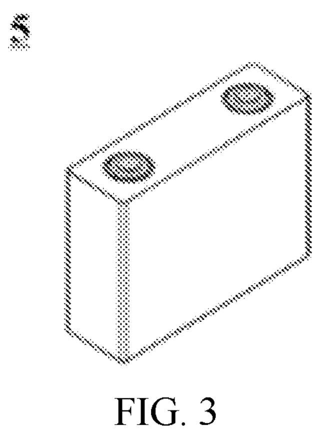
FIG. 3 is a schematic diagram of a secondary battery according to an embodiment of the present application.

The present application has no particular limitation on the shape of the secondary battery, which may be cylindrical, square, or in any other shape. For example, FIG. 3 is a secondary battery 5 in a square structure as an example.

Figures 4, 5, 6:
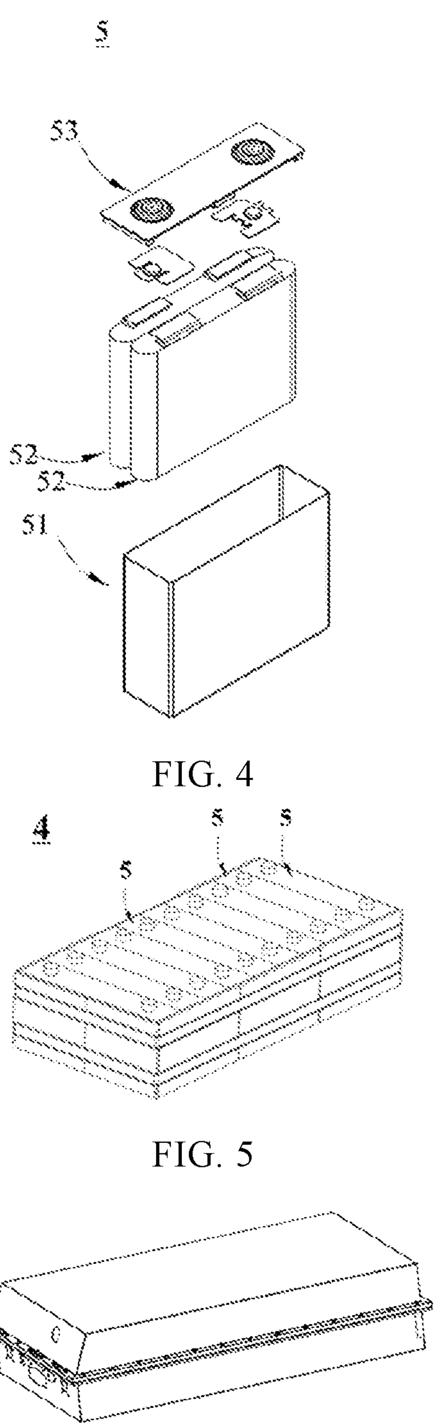
FIG. 4 is an exploded view of the secondary battery according to the embodiment of the present application shown in FIG. 3.
FIG. 5 is a schematic diagram of a battery module according to an embodiment of the present application.
FIG. 6 is a schematic diagram of a battery pack according to an embodiment of the present application.

In some embodiments, with reference to FIG. 4, the outer package may include a housing 51 and a cover plate 53. The housing 51 may include a bottom plate and side plates connected to the bottom plate. The bottom plate and the side plates are enclosed to form an accommodating cavity. The housing 51 has an opening that is in communication with the accommodating cavity, and the cover plate 53 can cover the opening to close the accommodating cavity. A positive electrode sheet, a negative electrode sheet, and a separator may be subject to a winding process or a lamination process to form an electrode assembly 52. The electrode assembly 52 is packaged in the accommodating cavity. The electrolytic solution is infiltrated in the electrode assembly 52. The number of electrode assemblies 52 included in the secondary battery 5 may be one or more, which can be selected by persons skilled in the art according to specific actual needs.

In some embodiments, secondary batteries may be assembled into a battery module, the number of secondary batteries included in the battery module may be one or more, and the specific number may be selected by persons skilled in the art according to application and capacity of the battery module.

FIG. 5 is a battery module 4 as an example. With reference to FIG. 5, in the battery module 4, a plurality of secondary batteries 5 may be sequentially arranged along a length direction of the battery module 4. Certainly, they may be arranged in any other manner. Further, the plurality of secondary batteries 5 may be fixed with fasteners.

Optionally, the battery module 4 may further include a shell with an accommodating space, and the plurality of secondary batteries 5 are accommodated in the accommodating space.

In some embodiments, the foregoing battery modules may be further assembled into a battery pack, and the number of battery modules included in the battery pack may be one or more, and the specific number may be selected by persons skilled in the art according to application and capacity of the battery pack.

Figure 7:
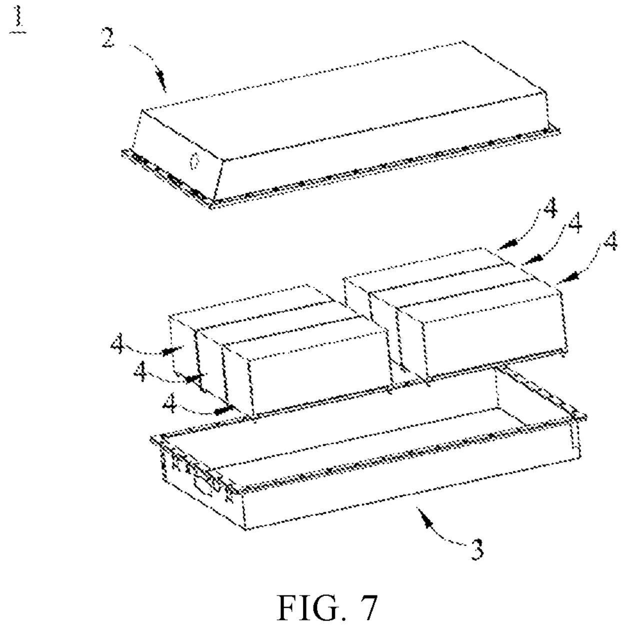
FIG. 7 is an exploded view of the battery pack according to the embodiment of the present application shown in FIG. 6.

FIG. 6 and FIG. 7 are a battery pack 1 as an example. With reference to FIG. 6 and FIG. 7, the battery pack 1 may include a battery box and a plurality of battery modules 4 disposed in the battery box. The battery box includes an upper box body 2 and a lower box body 3. The upper box body 2 can cover the lower box body 3 and form an enclosed space for accommodating the battery modules 4. The plurality of battery modules 4 may be arranged in the battery box in any manner.

In addition, the present application further provides a power consumption apparatus including at least one of the secondary battery, the battery module, or the battery pack provided in the present application. The secondary battery, the battery module, or the battery pack can be used as a power source of the power consumption apparatus, or as an energy storage unit of the power consumption apparatus. The power consumption apparatus may include a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf cart, or an electric truck), an electric train, a ship and satellite, an energy storage system, and the like, but is not limited thereto.

As the power consumption apparatus, a secondary battery, a battery module, or a battery pack may be selected according to usage requirements.

Figure 8:
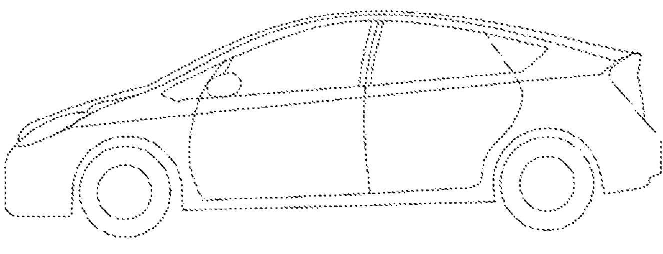
FIG. 8 is a schematic diagram of a power consumption apparatus in which a secondary battery is used as a power source according to an embodiment of the present application.

FIG. 8 is a power consumption apparatus as an example. The power consumption apparatus is a full electric vehicle, a hybrid electric vehicle, a plug-in hybrid electric vehicle, or the like. To meet a requirement of the power consumption apparatus for high power and high energy density of a secondary battery, a battery pack or a battery module may be used.

In another example, the power consumption apparatus may be a mobile phone, a tablet computer, a notebook computer, or the like. The power consumption apparatus usually requires lightness and thinness, and a secondary battery may be used as a power source.

EMBODIMENTS

Embodiments of the present application will be described hereinafter. The embodiments described below are exemplary and merely used to explain the present application, and may not be understood as limitation to the present application. Where specific techniques or conditions are not specified in the embodiments, they are performed according to techniques or conditions described in the literature in the art or according to product specifications. The reagents or instruments used without specifying the manufacturer are conventional products that can be obtained from the market.

Embodiment 1

[Preparation of Positive Electrode Sheet]

A positive active material of LFP, a conductive agent of SP and a binder of PVDF were mixed evenly in a solvent of NMP in a mass ratio of 97:1:2 to obtain a first positive electrode slurry, the first positive electrode slurry was evenly coated on a surface of a positive electrode current collector of A1 foil with a thickness of 13 μm, and after drying at room temperature, it was dried at 110° C. for 2 hours, and cold-pressed to obtain a positive film layer A1 with a thickness of 87 μm, compacted density of 2.4 g/cm$^3$, and a capacity per unit area of 33.2 Ah/m$^2$; the positive active material of LFP, the conductive agent of SP and the binder of PVDF were mixed evenly in the solvent of NMP in the mass ratio of 97:1:2 to obtain a second positive electrode slurry, the second positive electrode slurry was evenly coated on another surface of the positive electrode current collector, and after drying at room temperature, it was dried at 110° C. for 2 hours, and cold-pressed to obtain a positive film layer B1 with a thickness of 108 μm, compacted density of 2.4 g/cm$^3$, and a capacity per unit area of 41.5 Ah/m$^2$; and then, cutting was performed to obtain a positive electrode sheet of 87 cm×200 cm.

[Preparation of Negative Electrode Sheet]

A negative active material of artificial graphite, a conductive agent of SP and a binder of SBR were mixed evenly in deionized water in a mass ratio of 97:1:2 to obtain a first negative electrode slurry, the first negative electrode slurry was evenly coated on a surface of a negative electrode current collector of Cu foil with a thickness of 6 μm, and after drying at room temperature, it was dried at 110° C. for 2 hours, and cold-pressed to obtain a negative film layer A2 with a thickness of 59 μm, compacted density of 1.65 g/cm$^3$, and a capacity per unit area of 36.5 Ah/m$^2$; the negative active material of artificial graphite, the conductive agent of SP and the binder of SBR were mixed evenly in the deionized water in the mass ratio of 97:1:2 to obtain a second negative electrode slurry, the second negative electrode slurry was evenly coated on another surface of the negative electrode current collector, and after drying at room temperature, it was dried at 110° C. for 2 hours, and cold-pressed to obtain a negative film layer B2 with a thickness of 67 μm, compacted density of 1.65 g/cm$^3$, and a capacity per unit area of 41.5 Ah/m$^2$; and then cutting was performed to obtain a negative electrode sheet of 93 cm×320 cm, where the negative electrode current collector had about 9.5*106 circular through holes with a pore diameter of 200 μm, which accounted for 10% of the negative electrode current collector.

[Separator]

A separator was a polyethylene separator of 9 μm.

[Preparation of Electrolytic Solution]

Ethyl methyl carbonate (EMC), diethyl carbonate (DEC) and ethylene carbonate (EC) were mixed in a mass ratio of 5:2:3 to obtain an organic solvent, an intensively dried electrolyte salt of $LiPF_6$ was dissolved in the above solvent, a concentration of the electrolyte salt was 1 mol/L, and an electrolytic solution was obtained after evenly mixing.

[Production of Secondary Battery]

One positive electrode sheet, two separators and one negative electrode sheet were stacked in order, so that a positive film layer A1 was provided opposite to and separated from a negative film layer A2 by a separator, and a positive film layer B1 was provided opposite to and separated from a negative film layer B2 by a separator, and then they were wound to obtained a bare cell. The bare cell was placed in outer packaging foil, the above electrolytic solution was injected in a dried battery, and a secondary battery was obtained after processes of vacuum packaging, standing, chemical conversion, shaping, and the like.

Embodiment 2

Reference was made to Embodiment 1 for the production of the secondary battery as a whole, and the difference was in: during the preparation of the positive electrode sheet, the positive active material in the first positive electrode slurry and the second positive electrode slurry was replaced with $NCM_{523}$, and a positive film layer A1 was obtained after cold pressing, with a thickness of 51 μm, compacted density of 3.3 g/cm$^3$, and a capacity per unit area of 33.2 Ah/m$^2$; and a positive film layer B1 was obtained after cold pressing, with a thickness of 64 μm, compacted density of 3.3 g/cm$^3$, and a capacity per unit area of 41.5 Ah/m$^2$.

Embodiment 3

Reference was made to Embodiment 1 for the production of the secondary battery as a whole, and the difference was in: during the preparation of the positive electrode sheet, the positive active material of LFP in the first positive electrode slurry remained unchanged, and a positive film layer A1 was obtained after cold pressing, with a thickness of 87 μm, compacted density of 2.4 g/cm$^3$, and a capacity per unit area of 33.2 Ah/m$^2$; and the positive active material in the second positive electrode slurry was replaced with $NCM_{523}$, and a positive film layer B1 was obtained after cold pressing, with a thickness of 64 μm, compacted density of 3.3 g/cm$^3$, and a capacity per unit area of 41.5 Ah/m$^2$.

Embodiment 4

Reference was made to Embodiment 1 for the production of the secondary battery as a whole, and the difference was in: during the preparation of the negative electrode sheet, the negative active material in the first negative electrode slurry and the second negative electrode slurry was replaced with natural graphite, and a negative film layer A2 was obtained after cold pressing, with a thickness of 59 μm, compacted density of 1.6 g/cm$^3$, and a capacity per unit area of 36.5 Ah/m$^2$; and a negative film layer B2 was obtained after cold pressing, with a thickness of 67 μm, compacted density of 1.6 g/cm$^3$, and a capacity per unit area of 41.5 Ah/m$^2$.

Embodiment 5

Reference was made to Embodiment 1 for the production of the secondary battery as a whole, and the difference was in: during the preparation of the negative electrode sheet, the negative active material in the first negative electrode slurry remained unchanged, and a negative film layer A2 was obtained after cold pressing, with a thickness of 59 μm, compacted density of 1.65 g/cm$^3$, and a capacity per unit area of 36.5 Ah/m$^2$; and the negative active material in the second negative electrode slurry was replaced with natural graphite, and a negative film layer B2 was obtained after cold pressing, with a thickness of 67 μm, compacted density of 1.6 g/cm$^3$, and a capacity per unit area of 41.5 Ah/m$^2$.

Embodiment 6

Reference was made to Embodiment 1 for the production of the secondary battery as a whole, and the difference was in: the thicknesses of the positive film layer B1 and the negative film layer B2 were 124 μm and 77 μm, respectively.

Embodiment 7

Reference was made to Embodiment 1 for the production of the secondary battery as a whole, and the difference was in: the thicknesses of the positive film layer B1 and the negative film layer B2 were 91 μm and 57 μm, respectively.

Embodiment 8

Reference was made to Embodiment 1 for the production of the secondary battery as a whole, and the difference was in: the thicknesses of the positive film layer B1 and the negative film layer B2 were 144 μm and 89 μm, respectively.

Embodiment 9

Reference was made to Embodiment 1 for the production of the secondary battery as a whole, and the difference was in: the thickness of the negative film layer A2 was 55 μm.

Embodiment 10

Reference was made to Embodiment 1 for the production of the secondary battery as a whole, and the difference was in: the thickness of the negative film layer A2 was 64 μm.

Embodiment 11

Reference was made to Embodiment 1 for the production of the secondary battery as a whole, and the difference was in: the thickness of the negative film layer A2 was 57 μm.

Embodiment 12

Reference was made to Embodiment 1 for the production of the secondary battery as a whole, and the difference was in: the thickness of the negative film layer A2 was 70 μm.

Embodiment 13

Reference was made to Embodiment 1 for the production of the secondary battery as a whole, and the difference was in: the thickness of the negative film layer B2 was 62 μm.

Embodiment 14

Reference was made to Embodiment 1 for the production of the secondary battery as a whole, and the difference was in: the thickness of the negative film layer B2 was 64 μm.

Embodiment 15

Reference was made to Embodiment 1 for the production of the secondary battery as a whole, and the difference was in: the pore diameter of the through hole was 200 μm, and the number of circular through holes was $1.9*10^7$, which accounted for 20% of the negative electrode current collector.

Embodiment 16

Reference was made to Embodiment 1 for the production of the secondary battery as a whole, and the difference was in: the pore diameter of the through hole was 200 μm, and the number of circular through holes was $4.8*10^5$, which accounted for 0.5% of the negative electrode current collector.

Comparative Example 1

Reference was made to Embodiment 1 for the production of the secondary battery as a whole, and the difference was in: during the preparation of the positive electrode sheet, the first positive electrode slurry was coated on two surfaces of the positive electrode current collector, and a positive film layer was obtained after cold pressing, with a thickness of 87 μm, compacted density of 2.4 g/cm$^3$, and a capacity per unit area of 33.2 Ah/m$^2$; and during the preparation of the negative electrode sheet, the first negative electrode slurry was coated on two surfaces of the negative electrode current collector, a negative film layer was obtained after cold pressing, with a thickness of 59 μm, compacted density of 1.65 g/cm$^3$, and a capacity per unit area of 36.5 Ah/m$^2$, and no through holes were on the negative electrode current collector.

Performance Test of Electrode Sheet and Secondary Battery

1. Capacity per unit area of Positive Film Layer and Negative Film Layer

Using a button cell testing method, a gram capacity of an active material of a positive film layer or a negative film layer was determined; the mass per unit area of the active material in the positive film layer or the negative film layer was determined; and the gram capacity was multiplied by the mass to obtain a capacity per unit area of the positive film layer or the negative film layer.

The button cell testing method was: preparing an active material powder into a single-sided coated electrode sheet, assembling it with a lithium sheet to form a button cell, and obtaining a capacity of the button cell by charging and discharging at a rate of 0.1 C. The upper and lower limits of the voltage during charging and discharging were 2.5-4.05V for the positive active material of LFP, 2.5-4.35V for the positive active material of $NCM_{523}$, and 0.005-2V for the negative active material. A gram capacity parameter was obtained by dividing a capacity by the mass of the active material of the electrode sheet, and gram capacity parameters of positive and negative active materials could be accurately evaluated.

2. Electricity Hiding Ratio of Positive Electrode Sheet

A secondary battery was charged to 4.3V at a constant current of 1 mA cm$^{-2}$ at 25° C., and then charged at a constant voltage of 4.3V until a current dropped to 0.3 mA cm$^{-2}$ to obtain a first period charge capacity C1, and an electricity hiding ratio of a positive electrode sheet=1−(first period charge capacity/(Cap A1+Cap A2)).

A charge cut-off voltage of the positive electrode of lithium iron phosphate of the secondary battery was 4.0V.

3. Cycle Performance Test of Secondary Battery

A secondary battery was charged to 4.3 V at a constant current of 1.5 mA cm$^{-2}$ at 25° C., charged at a constant voltage of 4.3V until a current dropped to 0.3 mA cm$^{-2}$, and then discharged to 2.5V at a constant current of 1.5 mA cm$^{-2}$ to obtain a first period discharge specific capacity (Cd1); and charging and discharging were repeated in this way to the n$^{th}$ period to obtain a discharge specific capacity of the secondary battery after n periods of cycle, denoted as Cdn. A capacity retention rate of the secondary battery was calculated according to the following formula: capacity retention rate=discharge specific capacity after n periods of cycle (Cdn)/first period discharge specific capacity (Cd1); and the number of periods of cycle of the secondary battery was recorded at a time when 80% of the capacity remained.

A charge cut-off voltage of the positive electrode of lithium iron phosphate of the secondary battery was 4.0V.

4. Lithium Plating of Negative Electrode Sheet

The above secondary battery after 1000 periods of cycle was disassembled, the surface morphology of a negative electrode sheet was observed by magnification by 1000 times by a metallographic optical microscope (Axio Observer Z1M), and whether lithium dendrites were generated was observed.

The above embodiments and comparative example were tested respectively according to the above process, and the specific values are shown in Table 1.

TABLE 1

| | Positive active material | Negative Active Material | Ratio of through hole to negative electrode current collector | Cap A1/ Cap B1 | Cap A2/ Cap A1 | Cap B2/ Cap B1 | Electricity hiding ratio of positive electrode | Cycle number at 80% capacity | Capacity retention rate after 1000 periods of cycle | Lithium plating |
|---|---|---|---|---|---|---|---|---|---|---|
| Embodiment 1 | LFP | Artificial graphite | 10% | 0.8 | 1.1 | 1 | 14.5% | 5460 | 105.5% | No lithium plating |
| Embodiment 2 | $NCM_{523}$ | Artificial graphite | 10% | 0.8 | 1.1 | 1 | 14.5% | 4467 | 104.5% | No lithium plating |

TABLE 1-continued

| | Positive active material | Negative Active Material | Ratio of through hole to negative electrode current collector | Cap A1/ Cap B1 | Cap A2/ Cap A1 | Cap B2/ Cap B1 | Electricity hiding ratio of positive electrode | Cycle number at 80% capacity | Capacity retention rate after 1000 periods of cycle | Lithium plating |
|---|---|---|---|---|---|---|---|---|---|---|
| Embodiment 3 | Side A: LFP Side B: $NCM_{523}$ | Artificial graphite | 10% | 0.8 | 1.1 | 1 | 14.5% | 4964 | 100.8% | No lithium plating |
| Embodiment 4 | LFP | Natural graphite | 10% | 0.8 | 1.1 | 1 | 14.7% | 3298 | 99.7% | No lithium plating |
| Embodiment 5 | LFP | Side A: artificial graphite Side B: natural graphite | 10% | 0.8 | 1.1 | 1 | 14.6% | 4379 | 102.6% | No lithium plating |
| Embodiment 6 | LFP | Artificial graphite | 10% | 0.7 | 1.1 | 1 | 23.5% | 6997 | 114.5% | No lithium plating |
| Embodiment 7 | LFP | Artificial graphite | 10% | 0.95 | 1.1 | 1 | 4.6% | 4230 | 96.5% | No lithium plating |
| Embodiment 8 | LFP | Artificial graphite | 10% | 0.6 | 1.1 | 1 | 35.5% | 3080 | 93.5% | No lithium plating |
| Embodiment 9 | LFP | Artificial graphite | 10% | 0.8 | 1.02 | 1 | 17.8% | 6020 | 108.8% | No lithium plating |
| Embodiment 10 | LFP | Artificial graphite | 10% | 0.8 | 1.2 | 1 | 9.3% | 4588 | 100.3% | No lithium plating |
| Embodiment 11 | LFP | Artificial graphite | 10% | 0.8 | 1.06 | 1 | 15.9% | 5709 | 106.9% | No lithium plating |
| Embodiment 12 | LFP | Artificial graphite | 10% | 0.8 | 1.3 | 1 | 4.6% | 3779 | 95.6% | No lithium plating |
| Embodiment 13 | LFP | Artificial graphite | 10% | 0.8 | 1.1 | 0.92 | 18.6% | 6157 | 109.6% | No lithium plating |
| Embodiment 14 | LFP | Artificial graphite | 10% | 0.8 | 1.1 | 0.96 | 16.5% | 5809 | 107.5% | No lithium plating |
| Embodiment 15 | LFP | Artificial graphite | 20% | 0.8 | 1.1 | 1 | 13.5% | 5290 | 104.5% | No lithium plating |
| Embodiment 16 | LFP | Artificial graphite | 0.5% | 0.8 | 1.1 | 1 | 15.5% | 5630 | 106.5% | No lithium plating |
| Comparative Example 1 | LFP | Artificial graphite | 0 | 1 | 1.1 | 1.1 | 0 | 3000 | 91% | No lithium plating |

It can be known from Table 1 that, the cycle numbers at 80% capacity and the capacity retention rates after 1000 periods of cycle of the secondary batteries of all the above embodiments are all higher than those of the secondary battery in the comparative example. In addition, no lithium plating occurs on the secondary batteries of all the embodiments.

Comparing Embodiments 1 to 5 with Comparative Example 1 comprehensively, by adjusting and controlling the capacity ratio of the positive film layers on both sides of the positive electrode sheet and drilling a hole on the negative electrode current collector, the cycle performance of the secondary battery is significantly improved.

Comparing Embodiment 1 with Embodiment 6 to Embodiment 8 comprehensively, when the ratio Cap A1/Cap B1 of the capacity per unit area of the positive film layer A1 to the capacity per unit area of the positive film layer B1 is greater than or equal to 0.7 and less than 1, the cycle number at 80% capacity and the capacity retention rate after 1000 periods of cycle of the secondary battery can be further improved.

Comparing Embodiment 1 with Embodiment 9 to Embodiment 12 comprehensively, when the ratio Cap A2/Cap A1 of the capacity per unit area of the negative film layer A2 to the capacity per unit area of the positive film layer A1 is 1.02-1.2, the cycle performance of the secondary battery can be further improved.

Comparing Embodiment 1 with Embodiment 13 to Embodiment 14 comprehensively, when the ratio Cap B2/Cap B1 of the capacity per unit area of the negative film layer B2 to the capacity per unit area of the positive film layer B1 satisfies max(Cap A1/Cap B1, (Cap B1+Cap A1−Cap A2)/Cap B1)≤Cap B2/Cap B1≤1, the cycle number at 80% capacity and the capacity retention rate after 1000 periods of cycle of the secondary battery can be further improved.

Comparing Embodiment 1 with Embodiment 15 to Embodiment 16 comprehensively, when the ratio of the area of the through hole on the negative electrode current collector to the area of the negative electrode current collector is 0.2-40%, the cycle number at 80% capacity and the capacity retention rate after 1000 periods of cycle of the secondary battery are all good.

It should be noted that the present application is not limited to the foregoing embodiments. The foregoing embodiments are merely examples, and embodiments having substantially the same constitution as the technical idea and exerting the same effects within the technical solution of the present application are all included within the technical scope of the present application. In addition, various modifications may be made to the embodiments by persons skilled in the art without departing from the spirit and scope of the present application, and other embodiments that are constructed by combining some of the constituent elements of the embodiments are also included in the scope of the present application.

What is claimed is:

1. A secondary battery, comprising a positive electrode sheet, a negative electrode sheet, and a separator placed between the positive electrode sheet and the negative electrode sheet, the positive electrode sheet comprising a positive electrode current collector and positive film layers A1 and B1 respectively provided on two surfaces of the positive electrode current collector, and the negative electrode sheet comprising a negative electrode current collector and negative film layers respectively provided on two surfaces of the negative electrode current collector, wherein each of the positive electrode film layers comprises a positive electrode active material selected from a lithium-containing phosphate of an olivine structure and a lithium transition metal oxide, wherein each of the negative electrode film layers comprises a negative electrode active material comprising artificial graphite, wherein capacities per unit area Cap A1 and Cap B1 of the positive film layers A1 and B1 satisfy 0.7<Cap A1/Cap B1<0.9, wherein a negative film layer provided opposite to and separated from the positive film layer A1 by a separator is A2, and capacities per unit area Cap A2 and Cap A1 of the negative film layer A2 and the positive film layer A1 satisfy 1.02<Cap A2/Cap A1≤1.2, and the negative electrode current collector of the negative electrode sheet is provided with at least one through hole.

2. The secondary battery according to claim 1, wherein a negative film layer provided opposite to and separated from the positive film layer B1 by a separator is B2, and capacities per unit area Cap B2 and Cap B1 of the negative film layer B2 and the positive film layer B1 satisfy max (Cap A1/Cap B1, (Cap B1+Cap A1-Cap A2)/Cap B1)≤Cap B2/Cap B1≤1.

3. The secondary battery according to claim 1, wherein a ratio of an area of the through hole to an area of the negative electrode current collector is 0.2%-40%.

4. The secondary battery according to claim 1, wherein a pore diameter of the through hole is 5-500 μm.

5. The secondary battery according to claim 1, wherein compacted density of the positive electrode sheet is 2.0-3.6 g/cc.

6. The secondary battery according to claim 1, wherein compacted density of the negative electrode sheet is 0.5-2 g/cc.

7. The secondary battery according to claim 1, wherein a pore diameter of the through hole is 200-500 μm.

8. The secondary battery according to claim 1, wherein a thickness of the positive film layer A1 is 51 μm to 87 μm, a thickness of the negative film layer A2 is 55 μm to 70 μm.

9. The secondary battery according to claim 1, wherein a thickness of the positive film layer B1 is 64 μm to 144 μm, a thickness of the negative film layer B2 is 57 μm to 77 μm.

10. A battery module, wherein the battery module comprises the secondary battery according to claim 1.

11. A battery pack, wherein the battery pack comprises the battery module according to claim 10.

12. A power consumption apparatus, wherein the power consumption apparatus comprises the secondary battery according to claim 1.

13. A power consumption apparatus, wherein the power consumption apparatus comprises the battery module according to claim 10.

14. A power consumption apparatus, wherein the power consumption apparatus comprises the battery pack according to claim 11.

* * * * *